(12) United States Patent
Ellenby et al.

(10) Patent No.: US 6,396,475 B1
(45) Date of Patent: May 28, 2002

(54) APPARATUS AND METHODS OF THE REMOTE ADDRESS OF OBJECTS

(75) Inventors: John Ellenby; Thomas Ellenby; Peter Ellenby, all of San Francisco; Joseph Page, San Diego, all of CA (US)

(73) Assignee: Geo Vector Corp., San Francisco, CA (US)

(*) Notice: Subject to any disclaimer, the term of this patent is extended or adjusted under 35 U.S.C. 154(b) by 0 days.

(21) Appl. No.: 09/384,470

(22) Filed: Aug. 27, 1999

(51) Int. Cl.$^7$ .................................................. G09G 5/00
(52) U.S. Cl. ....................... 345/156; 345/856; 345/619; 701/200
(58) Field of Search .............................. 345/156, 145, 345/146, 134, 133, 135, 157, 173, 169, 127, 131, 9, 339, 619, 625, 764, 783, 810, 856, 859, 860; 348/552, 211; 705/27; 701/200, 208, 209; 382/103

(56) References Cited

U.S. PATENT DOCUMENTS

| | | |
|---|---|---|
| 2,994,971 A | 8/1961 | Meisenheimer et al. ........ 35/44 |
| 3,729,315 A | 4/1973 | Conklin .......................... 96/27 |
| 3,769,894 A | 11/1973 | Conklin .......................... 95/85 |
| 3,923,370 A | 12/1975 | Mostron ....................... 350/55 |
| RE28,847 E | 6/1976 | Vizennor ..................... 350/302 |
| 4,425,581 A | 1/1984 | Schweppe et al. ........... 358/148 |
| 4,489,389 A | 12/1984 | Beckwith et al. ............ 364/522 |
| 4,600,200 A | 7/1986 | Oka et al. .................... 273/313 |
| 4,645,459 A | 2/1987 | Graf et al. ..................... 434/43 |
| 4,684,990 A | 8/1987 | Oxley .......................... 358/183 |
| 4,736,306 A | 4/1988 | Christensen et al. ........ 364/513 |
| 4,835,532 A | 5/1989 | Fant ............................. 340/728 |
| 4,855,822 A | 8/1989 | Narendra et al. ............ 358/103 |
| 4,940,972 A | 7/1990 | Mouchot et al. ............. 340/747 |
| 4,970,666 A | 11/1990 | Welsh et al. ................. 364/522 |
| 5,034,812 A | 7/1991 | Rawlings ..................... 358/108 |
| 5,072,218 A | 12/1991 | Spero .......................... 340/980 |
| 5,115,398 A | 5/1992 | De Jong ...................... 364/443 |
| 5,182,641 A | 1/1993 | Diner et al. ................. 358/103 |
| 5,252,950 A | 10/1993 | Saunders et al. ............... 345/9 |
| 5,296,854 A | 3/1994 | Hamilton et al. ........... 340/980 |
| 5,311,203 A | 5/1994 | Norton .......................... 345/7 |
| 5,353,134 A | 10/1994 | Michel et al. ................. 359/52 |
| 5,394,517 A | 2/1995 | Kalawsky .................... 395/129 |
| 5,410,649 A | 4/1995 | Gove .......................... 395/161 |
| 5,467,444 A | 11/1995 | Kawamura et al. ......... 395/141 |
| 5,479,597 A | 12/1995 | Fellous ........................ 395/154 |
| 5,528,232 A | 6/1996 | Verma et al. ........... 340/825.54 |
| 5,815,411 A | * 9/1998 | Ellenby et al. ................ 345/9 |
| 6,037,936 A | * 3/2000 | Ellenby et al. ............. 345/145 |

* cited by examiner

Primary Examiner—Xiao Wu
(74) Attorney, Agent, or Firm—Page Lohr

(57) ABSTRACT

A device for addressing objects via pointing is provided. In response to an object being addressed, a computer provides a graphical user interface which relates to the particular object being addressed. As different objects are addressed, the user interface provided changes to agree with the object being addressed at any given time. Devices have position and attitude determining facility in communication with a computer having prerecorded data and a graphical user interface.

14 Claims, 7 Drawing Sheets

APPARATUS AND METHODS OF THE REMOTE ADDRESS OF OBJECTS

BACKGROUND OF THE INVENTION

1. Field

The following invention disclosure is generally concerned with navigation apparatus and methods; it is specifically concerned with devices and methods for presenting mapping information in relation to a reference pointing direction while changing access to computer functionality in response to selections made by a user.

2. Prior Art

Co-pending applications having Ser. Nos.: 09/110,572 and 09/163,746, and application Ser. No. 09/384,469, filed Aug. 27, 1999 having a title "Apparatus and Methods for the Remote Address of Objects", are applications which relate to the present invention. Those disclosures in their entirety are incorporated herein by reference.

With reference to FIG. 10 of the 09/110,572 application, one will appreciate how a person using devices of that invention can point to and address objects of interest. However, the display does not provide for changes to access of a computer's functionality in response to selections being made.

While the systems and inventions of the art are designed to achieve particular goals and objectives, some of those being no less than remarkable, these inventions have limitations which prevent their use in new ways now possible. These prior art inventions are not used and cannot be used to realize the advantages and objectives of the present invention.

SUMMARY OF THE INVENTION

Comes now, John Ellenby, Peter Ellenby, Thomas Ellenby and Joseph Page with an invention of pointing and addressing devices having a special map interface and dynamic graphical user interfaces responsive to changes in the types of objects being addressed and selected.

Handheld computers come in many forms and may be used for a great plurality of functions. For example, a wireless telephone may serve as a computerized calendar and address book. Although a wireless telephone is not traditionally considered a computer, for purposes of this disclosure any device which contains computing or logic processing type facility is a 'computer'. Thus a wireless telephone with digital processing is said to be a computer.

In the computer arts, a system is generally comprised of a plurality of functions which may be selectively activated by a user. A user tends to engage various computer functions from time-to-time depending upon a user's needs for particular information. Sometimes certain functions relate to a particular event and are automatically made available to a user whenever the event occurs. For example, on receipt of an incoming telephone call, a wireless telephone may offer functionality in the form of a "caller ID" function, a messaging function, and a forwarding function. The 'event' being receipt of a call, the functions offered being those which relate to receiving calls. The event (the receipt of the call) triggers the computer to offer the user access to these functions.

Similarly, systems of the invention offer access to various computer functions in accordance with particular events which occur from time-to-time. In particular, when a user addresses certain objects known to the computer, the computer responds by offering functions which relate to the object being addressed. Addressed objects may include a particular object such as 3Com Park baseball stadium in San Francisco, Calif. , or a particular type of object such as a restaurant. The computer detects when the system is addressing a certain object or object type via positioning and pointing actions and a search of information in a database. In response to positioning and pointing actions taken by a user, the computer provides a graphical user interface, for example an interface in the form of a toolbar of icons. The functions offered on the toolbar relate to the particular object(s) being addressed.

Methods of the invention

Methods of the invention start with a step where position and attitude are measured. Position and attitude information is conveyed to a computer processor. In view of the position and attitude measured, a map image local to the position is formed from stored map data. A user interface in the form of an image display is used to present the map image arranged to agree with position and attitude measurements. An icon, herein called a 'present state icon', is presented in superposition with the map image to indicate the location of a point reference and the pointing direction of a directional reference to show a spatial relationship between the user(device) and the map. In addition, a comparison is made with data stored in a database to determine various data elements corresponding to objects which meet certain matching criteria. In response, information relating to objects may be presented at a user interface with the map image and present state icons. Further, a graphical interface device such as a 'toolbar' which provides access to a computer's various user functions is provided in response to objects or object types being addressed and/or selected.

Devices of the invention

Devices of the invention are arranged with directional and point references which may be envisaged as a pointing vector having one endpoint and infinite extent in any direction along a line. Means for determining the position of the point reference is included. Means for determining the pointing direction or attitude of the directional reference is also provided. A computer with a database of stored information is coupled to position and attitude determining means. Stored information includes map image data, data relating to certain objects, and general computer instructions or code. The computer has programming including a plurality of functions, some of which may be divided into groups of related functions, and those functions or groups of functions may be associated with certain objects or types of objects. In addition, a device computer is programmed to offer access to these computer functions via graphical user interfaces known as toolbars and drop-down menus. Finally, a display device is in communication with the computer.

Objectives of the Invention

It is a primary object of the invention to provide for remote addressing of objects.

It is an object of the invention to provide systems for addressing objects from remote locations via pointing towards the object.

It is a further object to provide apparatus and methods for interaction with objects via pointing actions taken by a user.

It is a further object of to provide means for interacting with objects via pointing actions including access to a computer's functions or function sets.

A better understanding can be had with reference to the detailed description of preferred embodiments and with reference to the appended drawings. These embodiments represent particular ways to realize the invention and are not inclusive of all ways possible. Therefore, there may exist embodiments that do not deviate from the spirit and scope of this disclosure as set forth by the claims, but do not appear here as specific examples. It will be appreciated that a great plurality of alternative versions are possible.

BRIEF DESCRIPTION OF THE DRAWING FIGURES

These and other features, aspects, and advantages of the present invention will become better understood with regard to the following description, appended claims and drawings where:

GLOSSARY OF SPECIAL TERMS

Figure 1:
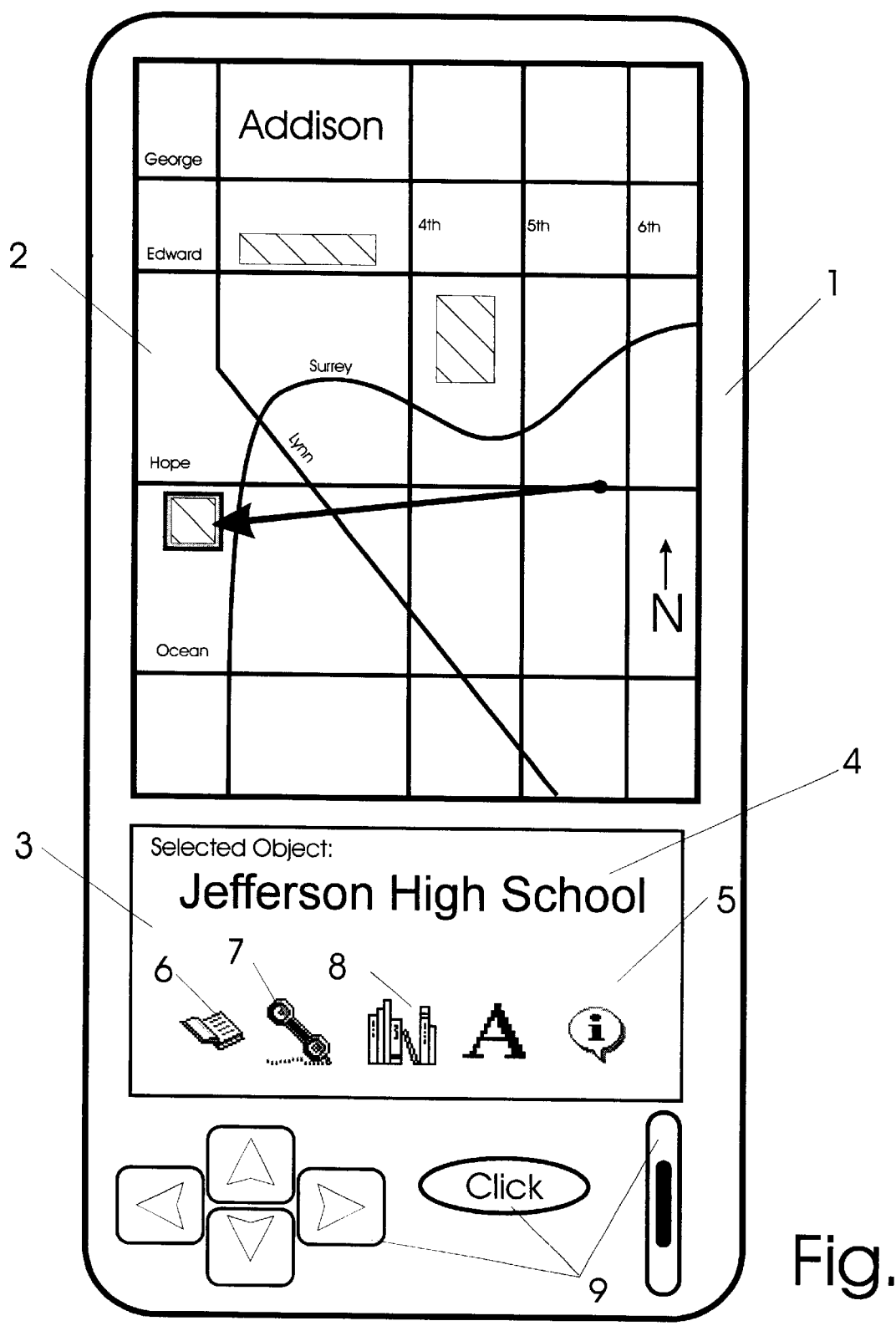
FIG. 1 illustrates a device of the invention having a graphical user interface with a map, text label, and toolbar presented therein.

Throughout this disclosure, reference is made to some terms which may or may not be defined in popular dictionaries exactly as they are defined here. To provide a more precise disclosure, the following terms are presented with a view to clarity so that the true breadth and scope may be more readily appreciated. Although every attempt is made to be precise and thorough, it is a necessary condition that all meanings associated with each term can not be completely set forth. Accordingly, each term is intended to also include its common meaning which may be derived from general usage within the pertinent arts or by dictionary meaning. Where the presented definition is in conflict with a dictionary or arts definition, one must use the context of use and liberal discretion to arrive at an intended meaning. One will be well advised to error on the side of attaching broader meanings to terms used in order to fully appreciate the depth of the teaching and to understand all the intended variations.

Objects

For purposes of the invention, an object includes both virtual and real objects. An object is any thing having some spatial extent. An object has spatial extent which may be described by a geometric descriptor. Thus, a building which occupies a cube shaped volume, the volume which can be described with simple geometric parameters is an example of a real object. Further, the plane which separates the states Illinois and Wisconsin has spatial extent and thus is also an object, albeit a 'virtual object', for purposes of this disclosure. A virtual object may be thought of as any geometric construct which does not correspond to a physical article or thing. Another useful example which illustrates a virtual object is the so called "strike zone" in the game baseball. Similarly, the volume which constitutes a restricted airspace is an example of a virtual object. For purposes of this disclosure, the Northern Hemisphere said to be an object. A single molecule of caffeine is an object.

Geometric Descriptor

A geometric descriptor is a spatial definition of a geometric body associated with an object.

Directional Reference Devices of the invention include a directional reference or sometimes herein a 'reference direction'. Directional references of the invention may by arranged as a matter of geometric definition or may be made to correspond to a physical device. In either case, a directional reference is a line segment which extends from a point, along any direction, with infinite extent.

Some versions of the invention include a hand held unit which may be elongated having a 'natural' axis in a longitudinal direction. One will appreciate that a common remote control device for a television set has a natural pointing direction and further note that accurate pointing has little to do with operation of the device. In hand held devices a longitudinal symmetry axis may serve as a good directional reference.

A Point Reference

Devices of the invention are said to have a point reference. A point reference is a geometric construct having the property of existing in exactly one place in space without extent in either of three spatial dimensions. Although a point reference may be made to coincide with a physical element or article (i.e. the center of), a point reference of the invention may be left as a mere construct of geometry.

Pointing Vector

A pointing vector is a vector type geometric construct having exactly one endpoint and infinite extent along some line. At any instant in time, devices of the invention have a point reference having a particular position and a directional reference aligned to a particular direction which gives rise to and defines a particular pointing vector.

Point

'Point' is sometimes used as a verb to indicate causing a directional reference of a device of the invention to be directed along any direction of the full four pi steradians of solid angle.

Address

'Address' is sometimes used as a verb in conjunction with the gerund 'ing' and means causing a pointing vector to intersect space described by the geometric descriptor of an object. It may include pointing only but sometimes also includes a 'click' event known in computer arts. One 'addresses' an object by pointing a directional reference associated with a device of the invention such that the directional reference extends towards the object being addressed and intersects at least a portion of the body described by the object's geometric descriptor.

Electronic Compass

An electronic compass is any device which determines a pointing attitude or direction and reports that measurement via electronic means.

Real-Time

A system which has a cycle time which is comparatively short in period with respect to human perception such that changes to system devices appear to human observers to occur as actual events occur.

Icon

An icon is a graphical element sometimes in the form of an image having mnemonic value which operates as a computer control to provide access to a particular function or group of related functions.

Toolbar

A toolbar is a graphical user interface device which sometimes includes a collection of icons which are related to each other.

Drop-Down Menu

A drop-down menu is a graphical user interface which presents a plurality of option choices in a text list or menu fashion.

As a matter of convention, it will be noted that 'objects' will be sometimes herein described as: "included objects";

"addressed objects", "selected objects" and a "focus object". These terms are to be distinguished from each other in the following way.

Included Objects

An object is said to be an "included object" if a map image is formed and the extent of the map image forms a boundary which at least partially contains or includes any space described by an object's geometric descriptor.

Addressed Objects

An object is said to be an "addressed object" provided that a pointing vector which represents a particular position and attitude intersects any space described by an object's geometric descriptor.

Selected Objects

An object is said to be a "selected object" when it has been designated by a default scheme or by a user causing a selection indicator or pointer to be moved within a group of objects, for example within a plurality of addressed objects.

Focus Objects

An object is said to be a focus object if a cursor has been moved onto a graphical representation of that object in a map image.

A few rules will improve an understanding of the relationship between these object definitions. 1) All objects within any map image are included objects. 2) All objects intersecting a pointing vector are addressed objects. 3) All addressed objects are included objects. 4) A selected object is always an addressed object. 5) A focus object is always an included object. 6) A focus object may be a selected object.

Terms which are functional in nature may be used throughout this disclosure including the claims. For example, 'means for' or 'step for' followed by a phrase describing a function. One should remain mindful that any particular means which may a be later provided as an example is not meant to limit the 'means for' to that example but rather the example is provided to further illustrate certain preferred possibilities. Thus the 'means for' or 'step for' should not be limited to any particular structure which may be called out as an example but rather to any conceivable means of causing the function described to be effected. The reader will recognize it is the function to be carried out which is the essence of the invention and many alternative means for causing the function to occur may exist without detracting from any combination or combinations taught as part of the invention.

Attitude Determining Means

An attitude determining means is any means of determining attitude not inconsistent with objectives and functions of any other element of devices of the invention.

Position Determining Means

A position determining means is any means of determining position not inconsistent with objectives and functions of any other element of devices of the invention.

PREFERRED EMBODIMENTS OF THE INVENTION

In accordance with each of the preferred embodiments of the invention, there is provided systems for remote addressing of objects. It will be appreciated that each of the embodiments described include both apparatus and methods and that the apparatus and method of one preferred embodiment may be different than the apparatus and method of another embodiment.

Systems of the invention may be used to address objects from remote locations. As is readily appreciated in view of the detailed disclosures mentioned above, a user may simply point a device of the invention towards an object to address it. A computer determines in real-time which objects are being addressed by comparing object descriptors which are stored in a database with an instant pointing vector. In the case where a plurality of objects are simultaneously being addressed, a default mechanism causes one of the plurality to be a 'selected object', for example the object which lies nearest the user. After a selected object is chosen, the computer refers to the database to determine the selected object type. In agreement with the selected object's type, the computer presents to the user a special graphical user interface in the form of a toolbar or drop-down menu which permits the user access to certain functions of the computer which relate to the type of object selected.

A Detailed Example

To further illustrate this concept in detail, a map of a fictional township Addison is presented in FIG. 1 with a device of the invention 1. An image of a map is presented in a first display region 2. A second display region 3 may be reserved for presentation of text and icon information which relates to a displayed map or objects displayed in the map. For example, text label 4 describes a currently selected object. A particular toolbar 5 appropriate for a currently selected object, in this case Jefferson High School, may include a book icon 6, a telephone icon 7, and a library icon 8. Tactile controls 9 provide feedback means to the computer and may include buttons, wheels, nibs, joysticks, touch-screens among others. A user may manipulate controls to direct a computer.

For this example, it is assumed that a user is located and holding the device on Hope street between $5^{th}$ and $6^{th}$ Avenues; closer to $6^{th}$. In addition, the user is assumed to be pointing the directional reference on a compass heading of 263 degrees. Upon activation of the device, and periodically at various times thereafter, the device includes means for determining the position of the point reference. A global position system receiver may be used to determine the position of the device. Similarly, the attitude of the device's directional reference is measured. This may be accomplished via an electronic compass such as a flux gate compass. Alternatively, an inertial system may be employed to monitor movements of the device and thereby keep track of the orientation of the directional reference. The exact manner in which the position and attitude is determined is not of great importance, however, the fact that these parameters are determined enables the invention. Thus the invention is not improved by employing alternative forms of position and attitude determining means and any conceivable position and attitude determining means is anticipated as being part of the invention.

Once a position and attitude is determined, the computer prepares a map image from a database of map information. The scale of the map may be set by a default mechanism which may be adjustable depending upon the application of the system. For example, a system used by a pedestrian may have a default map scale of a few miles; the range which is useful for pedestrian type journeys. Systems used for automobiles might be preferably set to have a map scale of a few tens of miles. A map may be aligned with the device display to show North being in the position corresponding to the top of the display. This is a conventional way of presenting maps in printed media. FIG. 1 shows this arrangement. FIG. 1 shows another important feature. Since the device is addressing an object in the direction West of the user, the map is formed with the user's position displaced to the right side of the map image field. In this way, more of what is of interest to the user is shown in the display field. It is not necessary that the user's current position be displayed in the center of the map image filed. Indeed, it is preferred that it is not. A more complete description of systems which account for these principles is presently in work.

After forming a map image with a useful scale and relation to the user's position in the map, the computer forms a special icon to graphically represent a user's current position and the direction in which the device is being pointed. Although the term 'user's position' is used here, it is to be understood that it is actually the position of the device being used by some user; it is assumed that the user and the device are together. A present state icon is an arrow with a dot for one endpoint. The dot represents the user's (device's) current position while the arrow indicate the direction in which the (directional reference of the) device is being pointed. A present state icon can be displayed simultaneously with an image of a map. Thus, superimposed upon the map of FIG. 1 is a present state icon in the form of an arrow having thereon a dot endpoint. The dot represents the location of the device, i.e. on Hope between $5^{th}$ and $6^{th}$; the arrow represents the direction in which the user is pointing the device. The present state icon is a graphical representation of an instantaneous pointing vector. The computer is able to generate the present state icon and superimpose it appropriately on the map because the device has a position and attitude information required for such calculations via the position and attitude determining means.

By searching through object information contained in the database, the computer can determine which objects are within the bounds of the map image formed in the step described above. These objects are said to be included objects. A graphical representation in proper perspective can be generated to correspond and agree with the user's present position and attitude. These graphical representations can be superimposed upon the map image to form part of a composite image.

After a map image, present state icon, and graphical representations of included objects are prepared, the computer executes programming to effect a step which determines if any objects in the database have object descriptors with an intersection with the instant pointing vector; a search for addressed objects is performed. In our example, close examination shows that the pointing vector represented by the present state icon intersects a building. This condition is detected in a search and examination of object descriptors in view of the determined position and attitude of the device. The test may be repeated after any changes in position or attitude. Upon any change to the position or attitude which is continuously being measured, the test for intersection is performed against data stored in the database to determine which objects, if any, are being addressed by the device.

Objects which have been determined to be objects presently being addressed may be labeled as such in a list. The building being addressed by the device in FIG. 1 is well known to the computer via the database of stored information which has been preprogrammed. Thus, the second display region can be used to further identify to the user the building being addressed in a text message which reads: "Jefferson High School". Names of objects or brief descriptions are stored in a database record associated with an object. When it is determined that an object is being addressed, these names are useful identifiers for objects and may appear in a list of addressed objects.

In addition, a database record associated with an object being addressed is interrogated for information relating to the type of object. In the case of the presented example, the object type parameter is a 'school'. Schools have certain attributes associated therewith which suggest how one might wish to use a computer device to interact with them. When it is determined that an object is being addressed, the type of object is recalled from the database for further processing. Although an object may belong to a class of objects, the class containing many members, for example Jefferson High School is one school in the group of all schools, for purposes of the present invention an object type may refer to a discrete and unique object where the object class contains only one item.

In agreement with the object type which is determined in a database recall step, a graphical user interface particular to the object type is selected. Object type information is passed to a computer routine used to select a graphical user interface appropriate for the particular object type. For example, a toolbar device associated with objects of the type being addressed may be selected and displayed at the device display. The toolbar provides users access to a computer's functions, specifically those functions which are related to the types of object presently being addressed. In the example, a toolbar relating to school type objects is displayed with five icons corresponding to functions useful when addressing schools. Stimulation of address book icon 6 activates a computer's address book function which includes the names and addresses of all students, teachers and staff of the school. By clicking on telephone icon 7, a user accesses the dial-up function of the device which places a telephone call. To review a booklist of all library books and textbooks used at the school, one engages the library icon 8. Other icons which provide access to computer functions relating to the object type selected, i.e. a school, are available on the toolbar designed for school objects. The school toolbar is automatically displayed anytime the device has a school as a selected object. If a user points the device at any school, this is determined by the computer and the toolbar is displayed. A computer's functions relating to a particular object type are thereby automatically exposed to the user whenever the user merely points the device at an object. When the user points the device at an object of a different type, the graphical user interface, i.e. toolbar, is updated to reflect the change. A new toolbar having new icons associated with different computer functions is presented in agreement with the newly addressed or selected object.

Various object types each have attributes which suggest different computer functions be available for those object types. Attributes of a financial building may require different computer functions than those of a school. Like a school, a financial building may have a directory and an information facility. However, a financial building may have a local quotation system for financial instruments like stocks and bonds which is accessed via a computer routine. Schools do not have similar functional needs. Thus it becomes useful to change a computer's functionality in accordance with objects which are being addressed. A device of the invention which is at first being used to address a school and then is changed to address a financial building has a toolbar which is updated with a corresponding change. Functions made available to a user at any time depend upon the objects which are being addressed at that time. Changes to the objects being addressed result in changes to functions offered on a toolbar.

Figure 2:
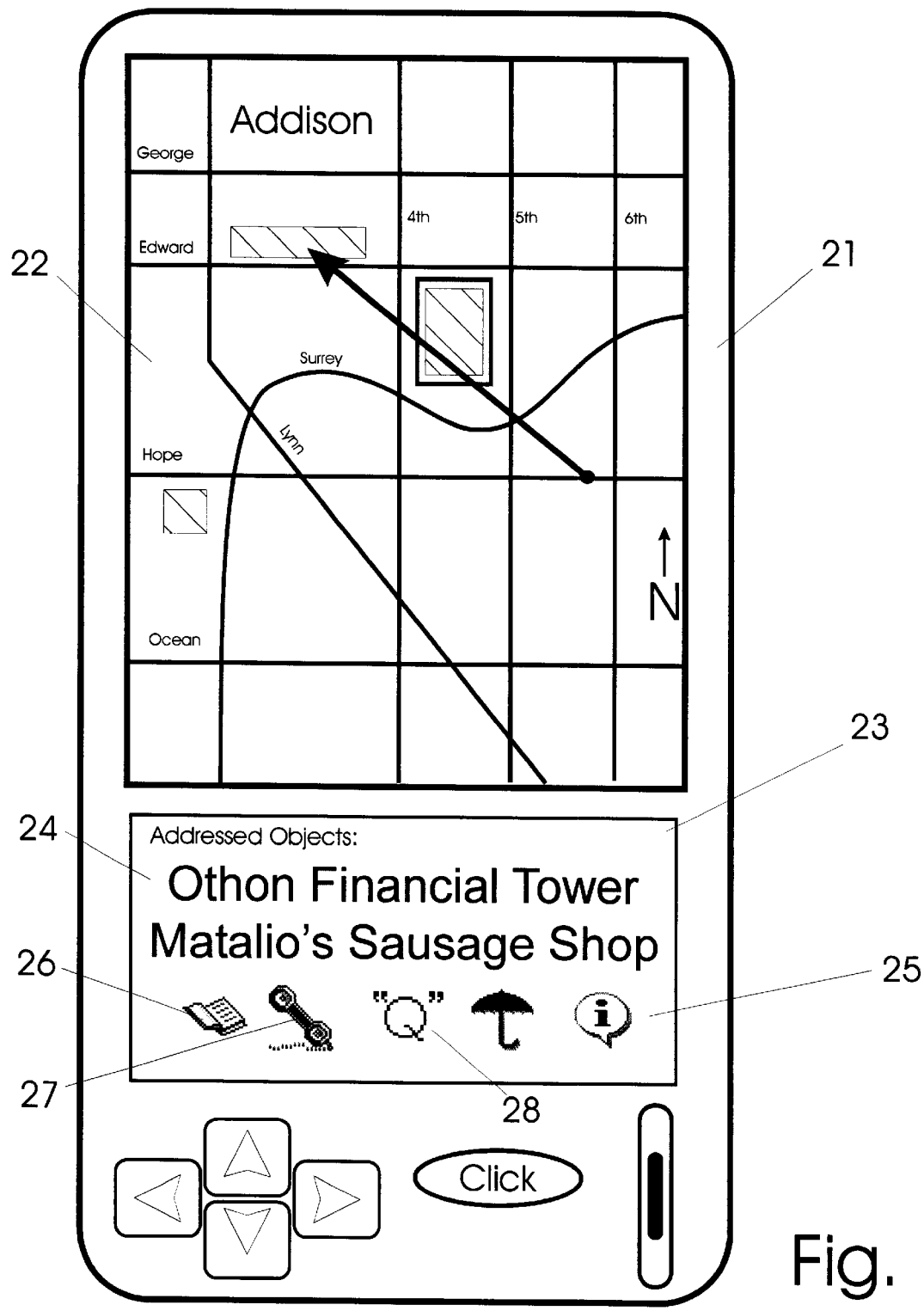
FIG. 2 illustrates a similar device where a plurality of objects are being addressed.

To more perfectly illustrate this, the drawing of FIG. 2 includes a device 21 of the invention having a map field 22, text field 23, text 24 to describe an object being addressed. In addition, five icons in a group form a toolbar type graphical user interface device. Careful observers will note that the map field has changed to reflect the device having been pointed in a new direction. A user, without changing position, may rotate the device in a horizontal plane to cause the device to be pointed along a compass heading of 308 degrees. In doing this, the user cause two objects to be addressed. The object descriptor for the Othon Financial Building and the object descriptor for Joe Matalio's Sausage Shop each share a portion of space with the pointing vector which corresponds to the position and attitude described. Thus both objects are said to be addressed objects. Since the Othon Financial Tower is nearer the user than the Sausage Shop, it is assigned the focus and becomes the selected object by default. A highlight field around the tower further indicates this condition. Highlight field 24 further indicates the Othon Financial Building being selected among two objects being addressed.

The display offers a toolbar in agreement with the selected object. In addition, a toolbar having a plurality of icons which represent functions particular to financial type buildings is presented. Like objects of the 'school' type, a directory icon 26 represents a computer directory function but in this case the directory is a directory of persons who are associated with the financial business, a call function is represented by a telephone icon 27, and an information icon 25 represents access to an information facility. These functions may be associated with many types of objects. However, some computer functions only apply to financial type objects. Functions particular to financial institutions include a stock quotation function represented by the quote icon 28. Stimulation of the quote icon causes the computer to take quotation actions against the Othon Financial Building object. Computer routines which generate stock quotes are made accessible to a user via the toolbar which is displayed whenever devices of the invention are pointed toward financial type buildings.

Although some computer functions are useful for several types of objects, others are unique to only one type. Schools and financial buildings share certain attributes and have others which are unique. Objects which are not schools or financial buildings have attributes which may cooperate with still other computer functions. For example, a restaurant. Restaurants have menus of food items which are offered. A user may wish to review the menu of a restaurant before choosing to visit. With devices of the invention having been programmed in advance, one can simply point the device at a desired restaurant thus causing it to be addressed, select the restaurant from a list of addressed objects if necessary, and choose one of a plurality of functions from a toolbar of functions which recalls menu information. In this way, a devices of the invention allow one to review menu items of a restaurant of interest without actually visiting the restaurant but rather by merely pointing at it.

Figure 3:
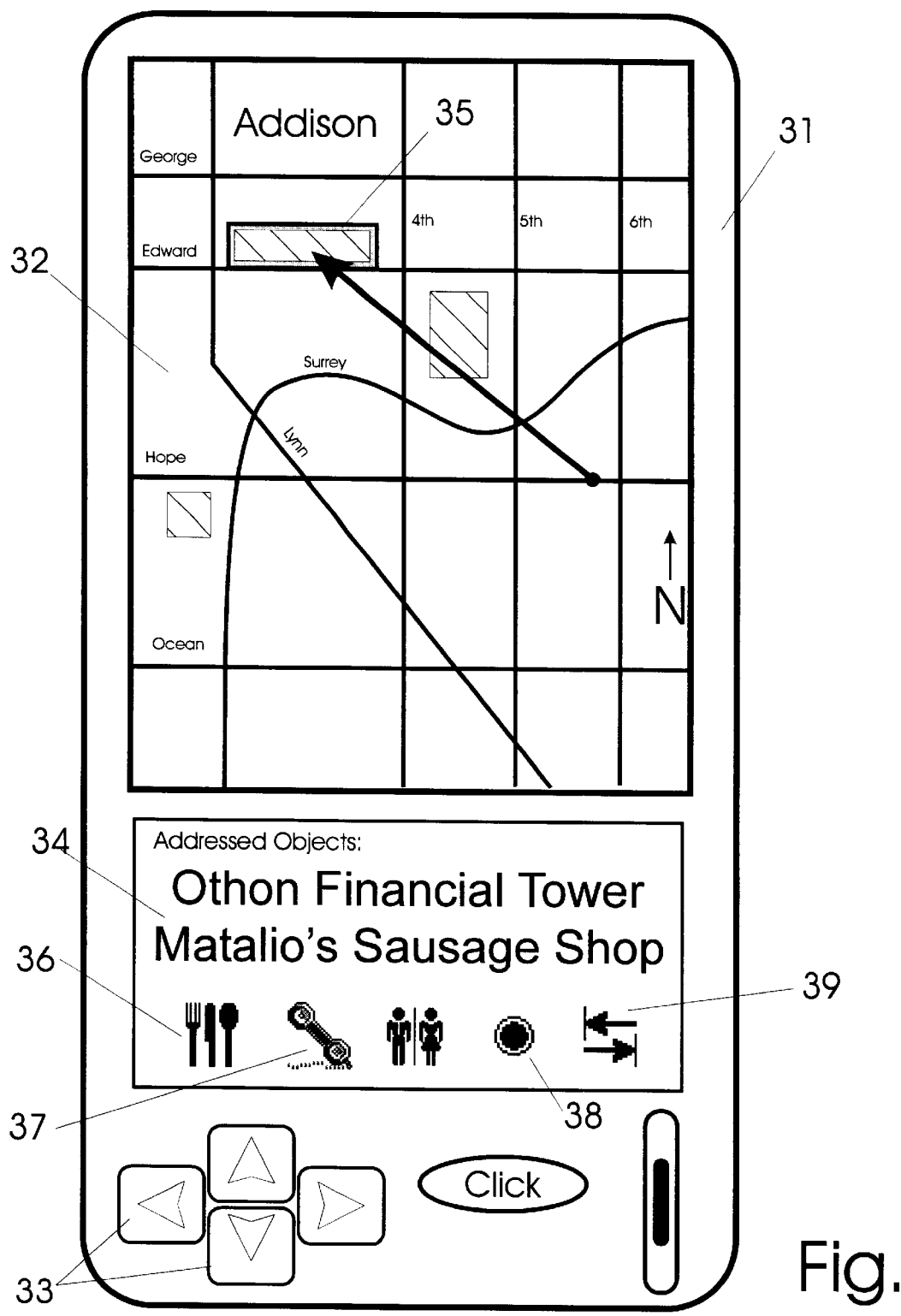
FIG. 3 illustrates a similar scenario where an alternate object is selected.

It is instructive to illustrate one way in which an object from a group of addressed objects is chosen. FIG. 3 illustrates a scenario where both the Othon Financial Building and Matalio's Sausage Shop are being addressed with a device of the invention 31 by a person standing between $5^{th}$ and $6^{th}$ Avenues on Hope Street. A map reflecting this arrangement is displayed in image field 32. Via careful operation of cursor keys 33, a user causes Matalio's Sausage Shop to be selected and that selection is indicated by text highlight field 34 and graphical highlight field 35 which highlights the object on the map. A toolbar which corresponds to the selected object type, i.e. a toolbar appropriate for restaurants, is displayed. Five icons each representing a different computer function can be accessed by way of stimulation of appropriate icon by point and click actions. The toolbar displayed is different than the toolbar of FIG. 2 because the selected object is of a different object type.

Matalio's Sausage Shop is in the restaurant type class of objects and thus the toolbar associated with that category is displayed allowing access to computer functions relating to restaurants. The first icon 36 in the toolbar having a fork, knife and spoon symbol provides access allowing a user to review a menu. Telephone icon 37 allows a user to call the restaurant. Reservation icon 38 allows the user to book a reservation with a standard user profile including preferences set in advance by the user. Changes icon 39 allows a user to make changes to an existing reservation. All of these functions relate to objects of the type 'restaurant'.

Figure 4:
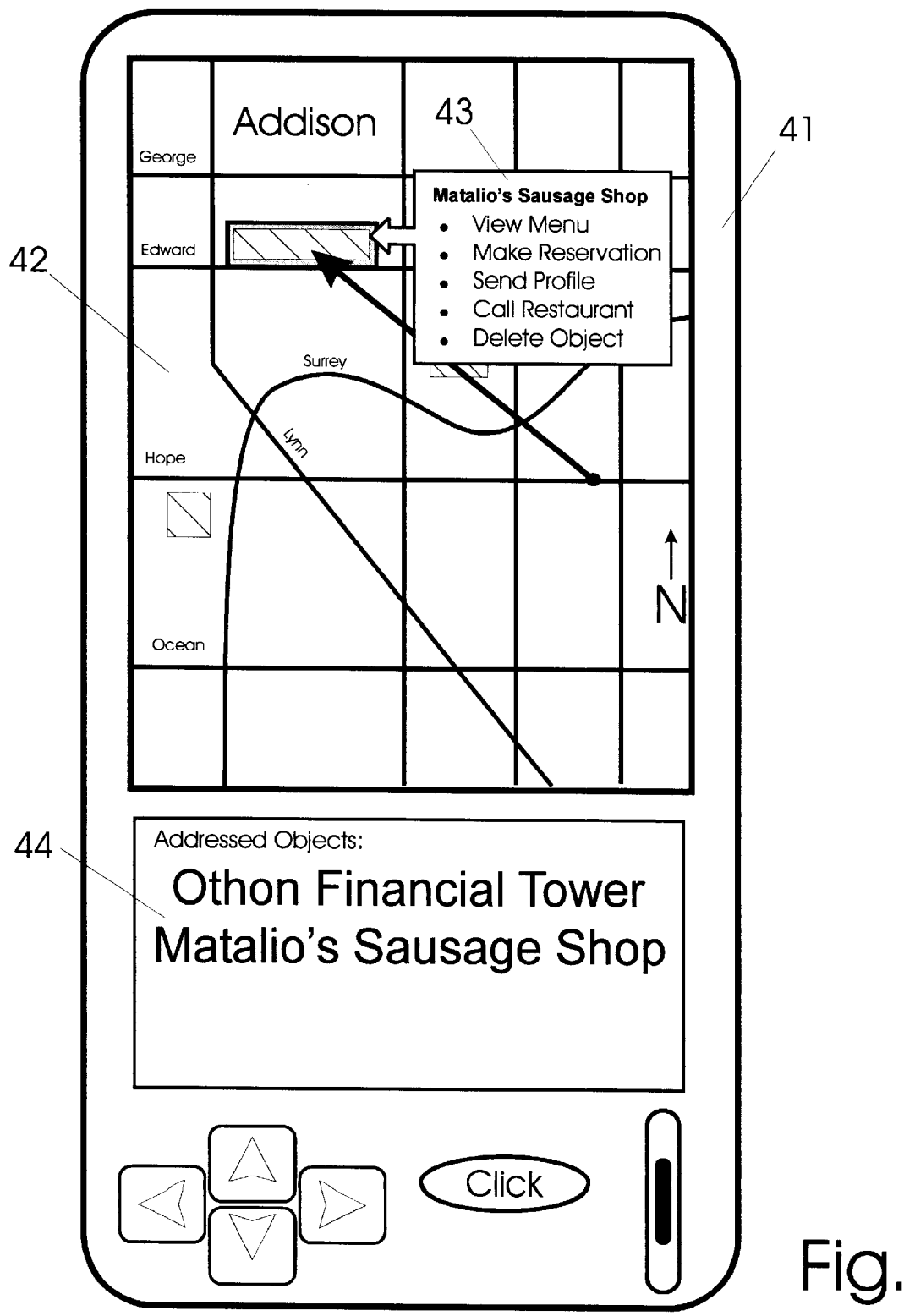
FIG. 4 illustrates a alternate type of graphical interface.

Although the examples above primarily rely on toolbar type graphical user interfaces for illustration, it is important to note the invention should not be limited to those types of graphical user interfaces. Indeed, other graphical user interfaces will prove to be exceptionally useful in allowing a user to access computer functions which relate to particular objects. The drawing of FIG. 4 shows a device of the invention 41 having a map image field 42 and a special graphical user interface 43 sometimes and herein known as a 'drop-down menu'. In response to objects being selected, a drop-down menu may be presented in proximity to the object as shown. Just as toolbar interfaces may change from object to object, choices presented on a drop down menu will depend on the object type. Since Matalio's Sausage Shop, an object in the restaurant type class, is illustrated as the selected object, the drop down menu includes restaurant related choice items such as "Make Reservation" and "View Menu".

Information may be exchanged between a selected object and a system of the invention in a bi-directional manner. The paragraph above mentions a 'user profile'. A user profile may be created and stored as part of the system. As part of the group of functions offered when restaurants are selected, a mechanism for transmitting information from the device to the addressed object is provided. A user profile may include preference information such as smoking/non-smoking; window table; frequent visitor privileges; et cetera. On making a reservation, a user profile may be transmitted as part of the reservation transaction. Information exchange and other similar concepts are further explained in detail in related disclosures.

Although under most circumstances it is a selected object to which a graphical user interface is connected, under others, one may wish to have access to computer functions with respect to other included objects. One will recall that all objects which appear in the map at any given time are considered to be 'included objects'. As a person moves with the device from a first location to another, the map to be displayed will change accordingly. The displayed map may also change in response to changes in the pointing direction of a device. Therefore, the group of objects which are included objects is highly dynamic with regard to position and attitude of devices of the invention.

Figure 5:
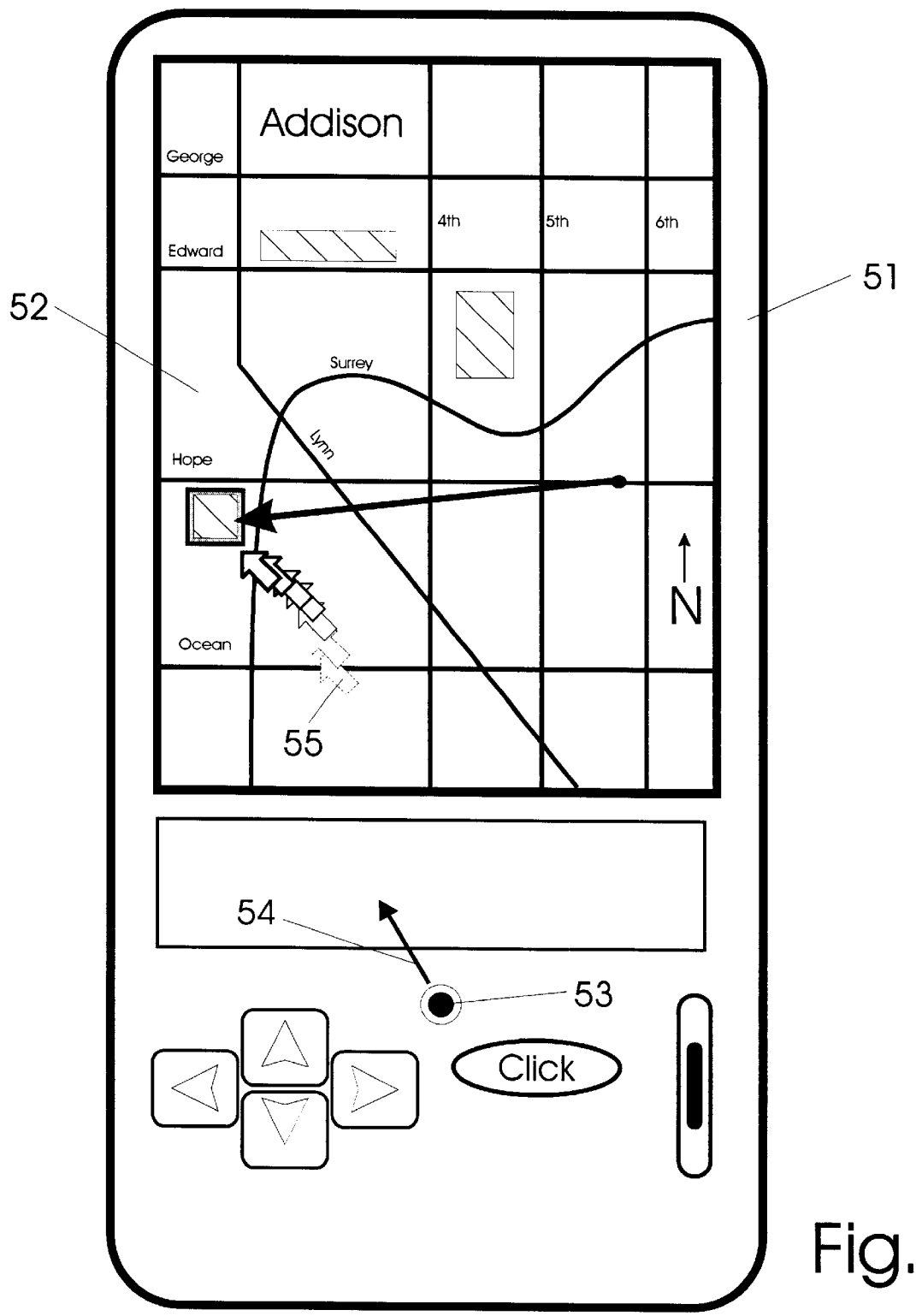
FIG. 5 shows a map image with a moving cursor thereon.
Figure 6:
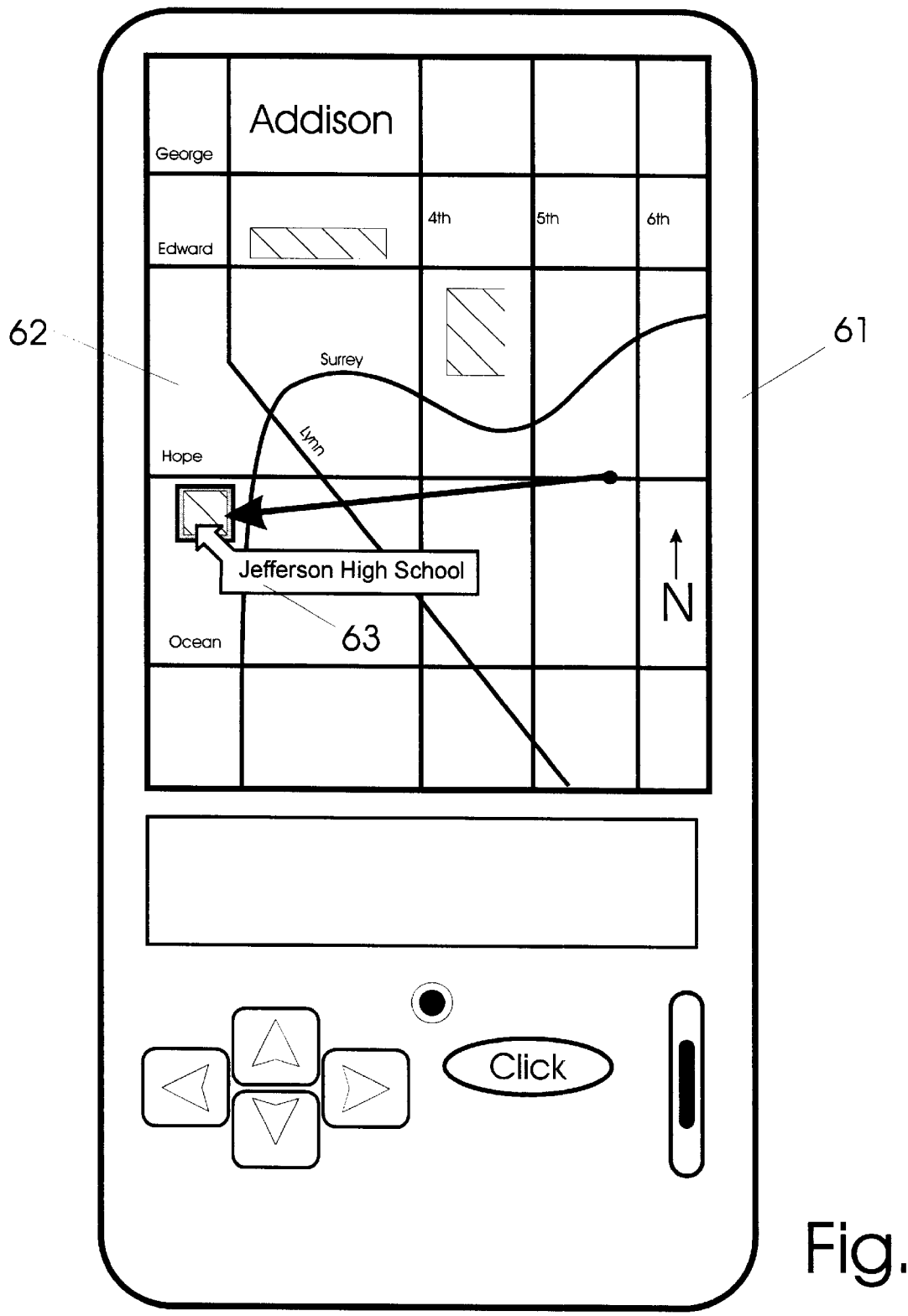
FIG. 6 shows a special cursor label in proximity to an object being addressed.
Figure 7:
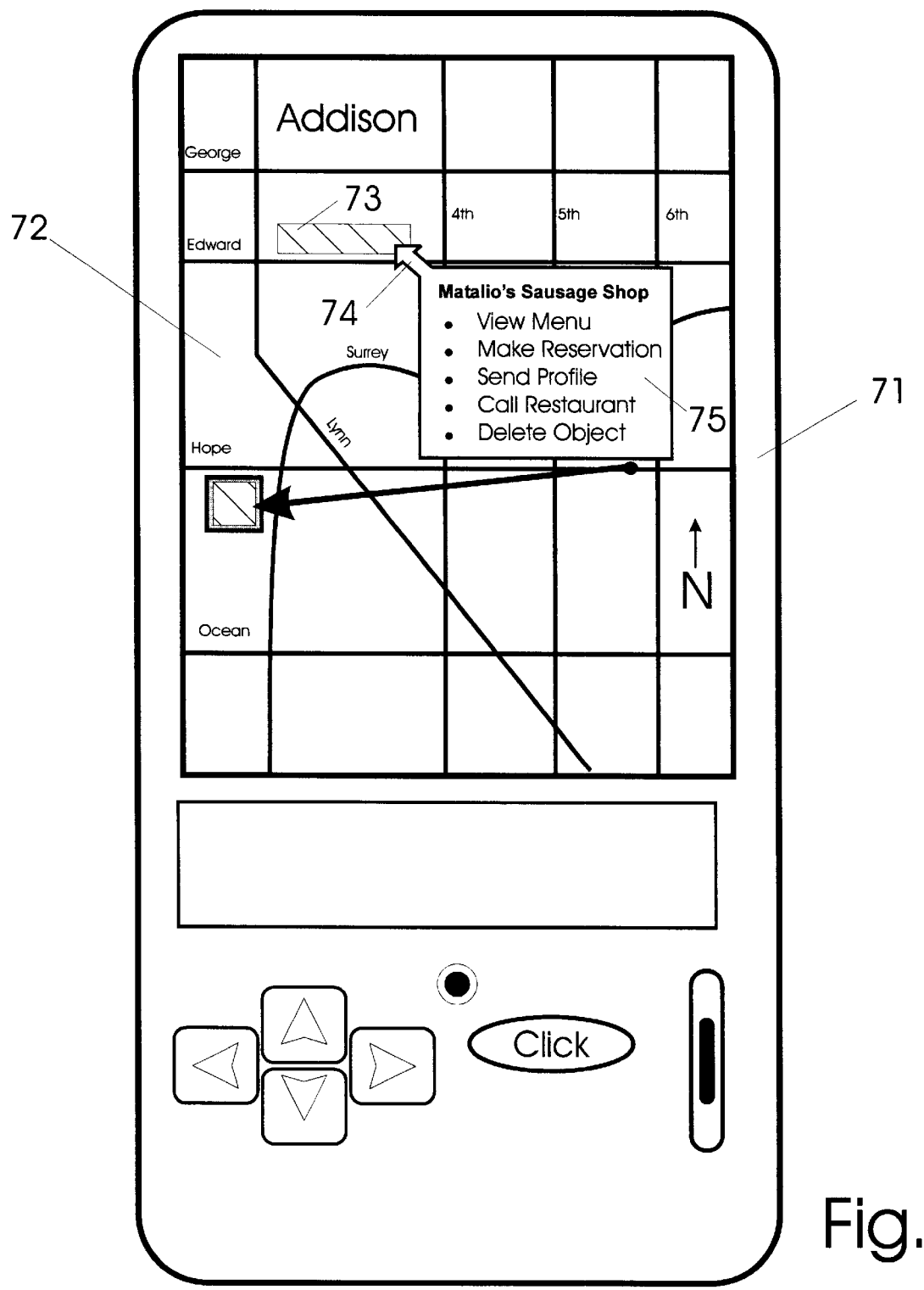
FIG. 7 illustrates a graphical user interface relating to an included object.

Sometimes it is desirable to interact with an included object without having to select it from a group of addressed objects. In these instances, a cursor which moves independently of a present state icon may be introduced. Such a cursor may be driven about a map image of the invention by conventional means such as a finger nib or joystick. FIG. 5 illustrates a device of the invention 51 with a map image in map image field 52 where finger nib 53 has applied thereto a force in a direction indicated by arrow 54. That force drives a cursor from a cursor starting point 55 towards an included object. While the position and attitude of the device does not change, one is still able to direct the computer's attention (i.e. the cursor) about a map image of included objects. If the cursor is driven further until it shares a portion of the image area with an included object, the object is said to become a focus object. When an object becomes a focus object the computer responds by providing a label to identify the object in a way similar to an object which is a selected object. This is illustrated in FIG. 6 where device 61 with map image field 62 has a cursor on included object Jefferson High School. Cursor label 63 identifies the object which has a cursor thereon. One will note that by way of the position and attitude of the device as indicated by the present state icon, the object corresponding to Jefferson High School is also the currently selected object. It is not a necessary condition that the cursor point at a selected object. Indeed, it is intended that the cursor operate without regard to a selected object. The cursor may be driven about the map image field to arrive at any included object therein. FIG. 7 shows where a cursor has been placed upon an object which is an included object but is not a selected object. Device 71 with map image field 72 has as an included object Matalio's Sausage Shop 73 on Edward Street. A cursor 74 has been moved to coincide with the graphical representation of the object. Special drop-down menu 75 has options relating to the restaurant which may be chosen by a user. In this way, a user is provided access to a computer's functions, said functions relating to particular objects, said objects being made available in accordance with a device's position and attitude.

On changes in position and attitude . . .

It is instructive at this point to provide a review which discusses actions taken by the computer in response to changes in position or attitude or both. When a device of the invention experiences a change in either position or attitude, it responds by updating the computer with new position and attitude information measured in real-time by position and attitude determining means. On receipt of new position and attitude information, a new pointing vector is computed. A map image is updated to reflect the changes to position and orientation. A present state icon is updated to represent the new pointing vector. A database search of object descriptors is performed with a view towards finding any objects which exist within the new map bounds and those which intersect the newly computed pointing vector; in other words, included objects and addressed objects are identified. Objects having object descriptors which meet these criteria are added to lists of currently included and addressed objects. A label for each object being addressed is added to a text list that is displayed to a user. By convention, a default object in the list is chosen to be a selected object. A text highlight field is added to the text label which corresponds to the selected object. A graphical highlight field is generated and placed with the appropriate object in the map image. The object type of the selected object is determined and a toolbar or other graphical user interface appropriate for that type of object is added to the display. Any changes to the selected object, i.e. via scroll keys, causes an update to the text labels, highlight fields, and graphical user interfaces. The process is repeated in real-time for all changes to position and attitude.

In brief, when a certain object becomes a selected object, a computer responds by displaying a toolbar appropriate for the type of the selected object. As one selects objects of a particular category, access to certain computer functions change in agreement with the type of object selected.

The examples above are directed to specific embodiments which illustrate preferred versions of devices and methods of the invention. In the interests of completeness, a more general description of devices and the elements of which they are comprised as well as methods and the steps of which they are comprised is presented hereinfollowing.

Apparatus of the Invention

An apparatus of the invention is generally comprised of: a point reference; a directional reference; a position determining means; an attitude determining means; a logic processor; and a user interface. These elements and the relationships between them are more fully described as follows:

Point Reference

A point reference is a mere geometric construct and does not necessarily lie on any physical object in particular. A point reference is arranged to cooperate with the position determining means. When a position determining means measures position, it does so with respect to some point reference. In the case of a global positioning system, GPS, receiver, an antenna receives signals from a plurality of satellites. The position determination has limited accuracy and has an associated error sometimes equal to a few tens of meters. Thus it can be said that a point reference is the center of a position determination including the associated error.

Directional Reference

A directional reference similarly is a geometric construct and does not necessarily correspond to any physical object. However, a directional reference is coupled to an attitude determining means which operates to measure the pointing direction or attitude of the directional reference. Further, a directional reference is sometimes coupled to a case or shell which houses components of devices of the invention. When a shell is constructed of rigid material it is sometimes made with a certain shape having a natural axis or pointing direction. By analogy, the shape of a remote control unit for a simple television set tends to imply a pointing direction by the feel of the device. Generally, a longitudinal axis of a device forms a good natural pointing direction. This is why an implement such as a pencil is good for pointing with because it has a pronounced longitudinal axis. An egg has a less pronounced longitudinal axis but may still be said to have a natural pointing direction. Although a Cokes® bottle has a complex shape, it has a longitudinal axis and a very distinguished and unmistakable pointing direction. Devices of the invention tend to have a reference direction which is aligned to a natural pointing direction of a case or shell containing other elements of the device.

Position Determining Means

A position determining means is any conceivable means for determining the position of a reference point. In most versions of the invention, a global positioning system serves as position determining means. A position determining means of the invention is coupled to both the point reference and the logic processing unit. The position determining means measures the position of the point reference and reports that information to the logic processing unit.

Attitude Determining Means

An attitude determining means is any conceivable means for determining the pointing direction or attitude of a directional reference. In most versions of the invention, an electronic compass serves as attitude determining means. An attitude determining means of the invention is coupled to both the directional reference and the logic processing unit. The attitude determining means measures the pointing direction or attitude of the point reference and reports that information to the logic processing unit.

Logic Processing Unit

A logic processing unit is an electronic device operable for executing programmed instructions or code and includes supporting subsystems such as but not limited to: memory, coprocessing facilities, comparators, input/output support, power management, et cetera.

Logic processing units of the invention also include memory configured as a database with prerecorded information stored therein. Databases of devices of the invention include a plurality of records. Each record is associated with an object and has a plurality of fields. At least one field in each record contains information relating to a spatial definition of the object associated with the record. The spatial definition of an object is sometimes and herein referred to as a 'geometric descriptor'. Geometric descriptors may be examined in tests for congruence with regard to other spatial constructs or objects. These examinations and tests are performed in the logic processing unit as a matter of course throughout the running of any program instructions or code.

Another record field may be reserved for a classification of object type. Objects may be grouped into classes according to object type. Each type of object may have a unique graphical user interface associated therewith. Graphical user interfaces displayed change in accordance with the object type as objects are selected.

Graphical user interfaces, sometimes in the form of a toolbar, provide access to a computer's functions. A collection of functions may be embodied as code modules which can be initiated in response to user stimulus via the graphical user interface. Therefore, part of a logic processor of the invention includes a collection of computer code modules referred to here as a computer's functions.

User Interface

A user interface is any device which converts electronic signals from a computer into a physical signal perceptible by human senses such as an audible signal or a visual signal. In most versions, a user interface is a display screen which operates to form graphical images thereon. User interfaces are electronically coupled to and are in communication with a logic processing unit. A display may be divided into several regions which may present information in images or as text, or both. For purposes of this disclosure, several cooperating displays will be referred to as a single display with no distinction intended.

Methods of the Invention

Methods of the invention are generally comprised of the following steps: a positioning determining step; an attitude determining step; a map forming step; a database query step; and a display step. These steps and the relationships between them are more fully described as follows:

Determining Position of a Point Reference

The position of a point reference is determined via an apparatus arranged to do such determinations. Information which reflects position measurement results is conveyed to a logic processing unit.

Determining Attitude of a Directional Reference

The pointing direction or attitude of a directional reference is determined via an apparatus arranged to do such determinations. Information which reflects attitude measurement results is conveyed to a logic processing unit.

Forming a Map Image

Based upon the information received with regard to position and attitude, a map image is formed with a scale which may be set by a default mechanism. Such map image having finite extent as determined by the limits of a display implies which objects are included objects. Any object having at least a portion of its geometric descriptor within the map boundaries is an included object. A present state icon to represent the current position and attitude is formed and superimposed upon the map image.

Querying a Database

A database query step is performed to identify objects which are included objects and addressed objects in view of the map formed in the previous step. Objects which fall within the bounds of the map image are included objects, while objects being pointed at are addressed objects. A selected object is chosen from the group of addressed objects in agreement with a default scheme such as the object closest to the user.

Recalling an Object Type Parameter

In another query step, an object type parameter is recalled from the database. If there is no focus object, then the object type is read from the selected object, otherwise the object type is read from the focus object.

Forming a Graphical User Interface

Form a GUI appropriate for the object type recalled in the above step.

Displaying

In a display step, the superposition of a map image and graphical representations text labels, of objects and graphical user interfaces related to objects is presented at a visual display.

One will now fully appreciate how objects may be remotely addressed while providing access to a computer's functions, said functions being unique to the objects being addressed. Although the present invention has been described in considerable detail with clear and concise language and with reference to certain preferred versions thereof including the best mode anticipated by the inventor, other versions are possible. Therefore, the spirit and scope of the invention should not be limited by the description of the preferred versions contained therein, but rather by the claims appended hereto.

What is claimed is:

1. Methods of remotely addressing objects comprising the steps:

i determining attitude of a directional reference;

ii determining position of a point reference;

iii forming a map image in accordance with said determined position and attitude;

iv querying a database to determine which objects are included objects;

v querying a database to determine which objects are addressed objects;

vi if more than one object is being addressed, designating one of the addressed objects as a selected object;

vii if exactly one object is being addressed, designating that object as a selected object; and viii forming a composite image comprising the map image, graphical representations of addressed and selected objects, and a present state icon which is indicative of determined position and attitude.

2. Methods of claim 1, said forming a map image step is further defined as forming a map image of a region containing the determined position, said map image having a peripheral boundary determined by a preset scale and the spatial limits of a display device onto which said map is to be displayed.

3. Methods of claim 1, where included objects are defined as those having an object descriptor which forms an intersection with an area represented by said map image.

4. Methods of claim 1, where addressed objects are defined as those having an object descriptor which forms an intersection with a pointing vector defined as a vector with infinite extent having an endpoint congruent with said reference point and direction colinear with said directional reference.

5. Methods of claim 1, where selected objects are determined in accordance with a default mechanism.

6. Methods of claim 5, where selected objects are determined as being the addressed object which is closest to the point reference.

7. Methods of claim 1, having the additional steps:

recalling from a database record associated with a selected object an object type parameter; and forming a graphical user interface in cooperation with said object type, where said composite image is also comprised of said graphical user interface.

8. Methods of claim 7, where cooperation means said graphical user interface provides access to computer functions which relate to the particular type of the selected object.

9. Methods of claim 8, where said graphical user interface is a toolbar type.

10. Methods of claim 9, where said graphical user interface is a drop-down menu type.

11. Methods of claim 10, where said drop-down menu is located in the composite image proximately with respect to a graphical representation of the object to which it relates.

12. Methods of claim 1, further comprising the steps:

vii setting a cursor which is movable under direction of user input; and viii forming a graphical user interface in response to a cursor being moved onto a graphical representation of an included object.

13. Methods of claim 12, where said graphical user interface is a toolbar.

14. Methods of claim 12, where said graphical user interface is a drop-down menu.

* * * * *